United States Patent
Hagiwara

(10) Patent No.: US 10,928,541 B2
(45) Date of Patent: Feb. 23, 2021

(54) LOGGING TOOL WITH MAGNETIC SOURCE AND ELECTRIC DIPOLE SENSOR FOR FORWARD AND LATERAL IMAGING

(71) Applicant: Aramco Services Company, Houston, TX (US)

(72) Inventor: Teruhiko Hagiwara, Houston, TX (US)

(73) Assignee: SAUDI ARABIAN OIL COMPANY

( * ) Notice: Subject to any disclaimer, the term of this patent is extended or adjusted under 35 U.S.C. 154(b) by 321 days.

(21) Appl. No.: 15/683,459

(22) Filed: Aug. 22, 2017

(65) Prior Publication Data
US 2019/0064382 A1  Feb. 28, 2019

(51) Int. Cl.
*G01V 3/28* (2006.01)
*G01V 3/26* (2006.01)
*G01V 3/10* (2006.01)
*E21B 7/04* (2006.01)

(52) U.S. Cl.
CPC ............... *G01V 3/28* (2013.01); *G01V 3/10* (2013.01); *G01V 3/26* (2013.01); *E21B 7/04* (2013.01)

(58) Field of Classification Search
CPC . G01V 3/08; G01V 3/12; G01V 3/165; G01V 3/17; G01V 3/26; G01V 3/30
See application file for complete search history.

(56) References Cited

U.S. PATENT DOCUMENTS

| | | | |
|---|---|---|---|
| 3,329,889 A | 7/1967 | Tanguy | |
| 3,479,581 A * | 11/1969 | Runge | G01V 3/26 324/338 |
| 3,493,850 A * | 2/1970 | Schuster | G01V 3/26 324/342 |
| 4,763,520 A * | 8/1988 | Titchener | E21B 43/26 340/854.6 |
| 4,770,034 A * | 9/1988 | Titchener | E21B 43/26 340/854.3 |
| 4,828,051 A * | 5/1989 | Titchener | E21B 17/003 166/250.09 |
| 5,955,884 A | 9/1999 | Payton et al. | |

(Continued)

OTHER PUBLICATIONS

The International Search Report and Written Opinion for related PCT application PCT/US2018/047512 dated Nov. 21, 2018.

(Continued)

*Primary Examiner* — Walter L Lindsay, Jr.
*Assistant Examiner* — Milton Gonzalez
(74) *Attorney, Agent, or Firm* — Bracewell LLP; Constance R. Rhebergen

(57) ABSTRACT

A logging method and system for imaging a subterranean formation intersected by a borehole. A magnetic dipole generates an electromagnetic field in the formation, and an electric field induced by the magnetic dipole is sensed. The electromagnetic field is sensitive to bed boundaries and other changes of formation characteristics, and becomes induced when encountering the changes. Monitoring the time and magnitude of field inducement yields information about the presence and location of the bed boundaries and target formations. The magnetic dipole is oriented transverse to the borehole axis, and measurements of the electric field take place in directions that include transverse to the orientation of the magnetic dipole and transverse to the borehole axis, parallel with the borehole axis, or both.

16 Claims, 13 Drawing Sheets

(56) References Cited

U.S. PATENT DOCUMENTS

| | | | |
|---|---|---|---|
| 7,242,194 B2* | 7/2007 | Hayman | G01V 3/24 |
| | | | 324/367 |
| 7,991,553 B2* | 8/2011 | Alumbaugh | G01V 3/30 |
| | | | 324/323 |
| 9,482,776 B2 | 11/2016 | Hagiwara | |
| 2003/0011371 A1 | 1/2003 | Rosthal et al. | |
| 2004/0119476 A1 | 6/2004 | Homan et al. | |
| 2011/0133740 A1 | 6/2011 | Sedoux et al. | |
| 2014/0216818 A1* | 8/2014 | Hagiwara | E21B 7/04 |
| | | | 175/61 |

OTHER PUBLICATIONS

J. Sedoux, et al., A Deep Resistivity Logging-While-Drilling Device for Proactive Geosteering, The Leading Edge, Jun. 1, 2004.

T. Hagiwara, Extra Long Spaced Induction Log, SEG Int'l Exposition and 74th Annual Meeting, Denver, CO, Oct. 10-15, 2004.

* cited by examiner

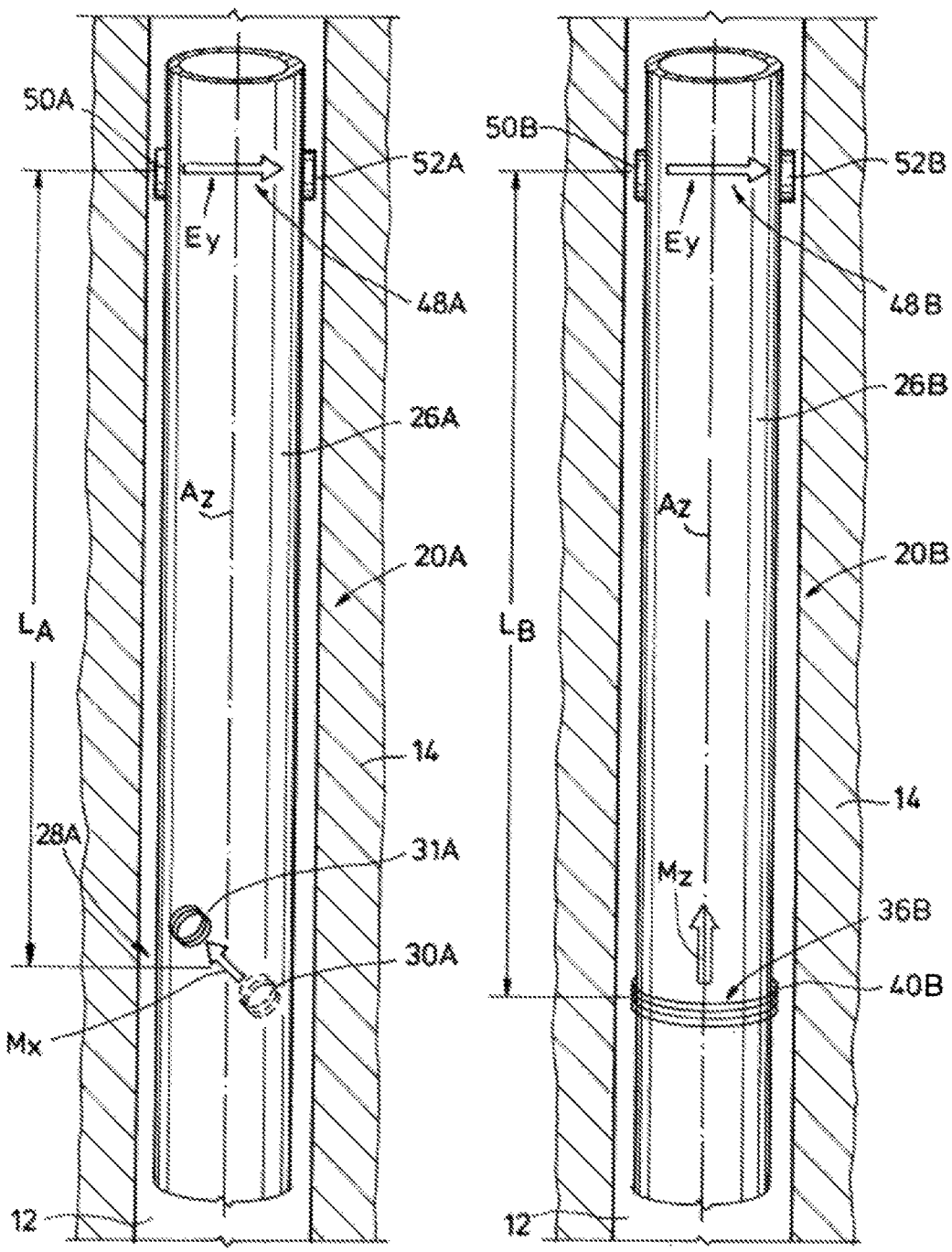

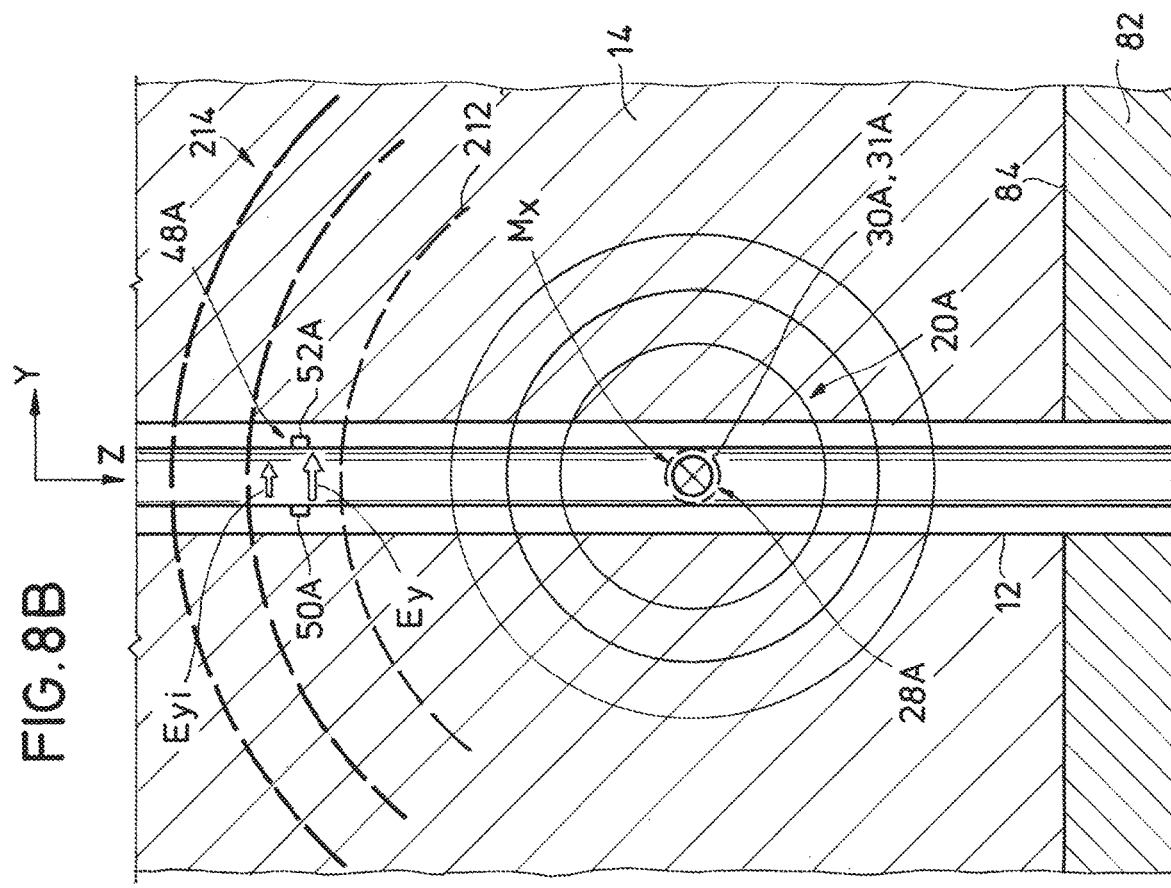
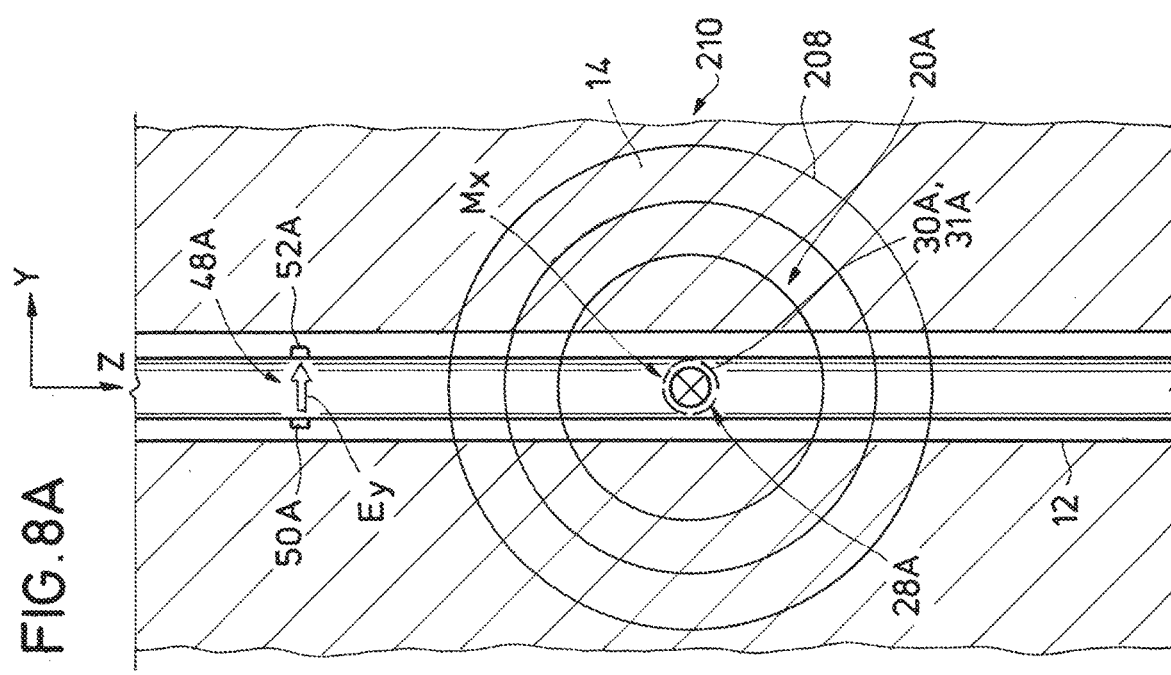

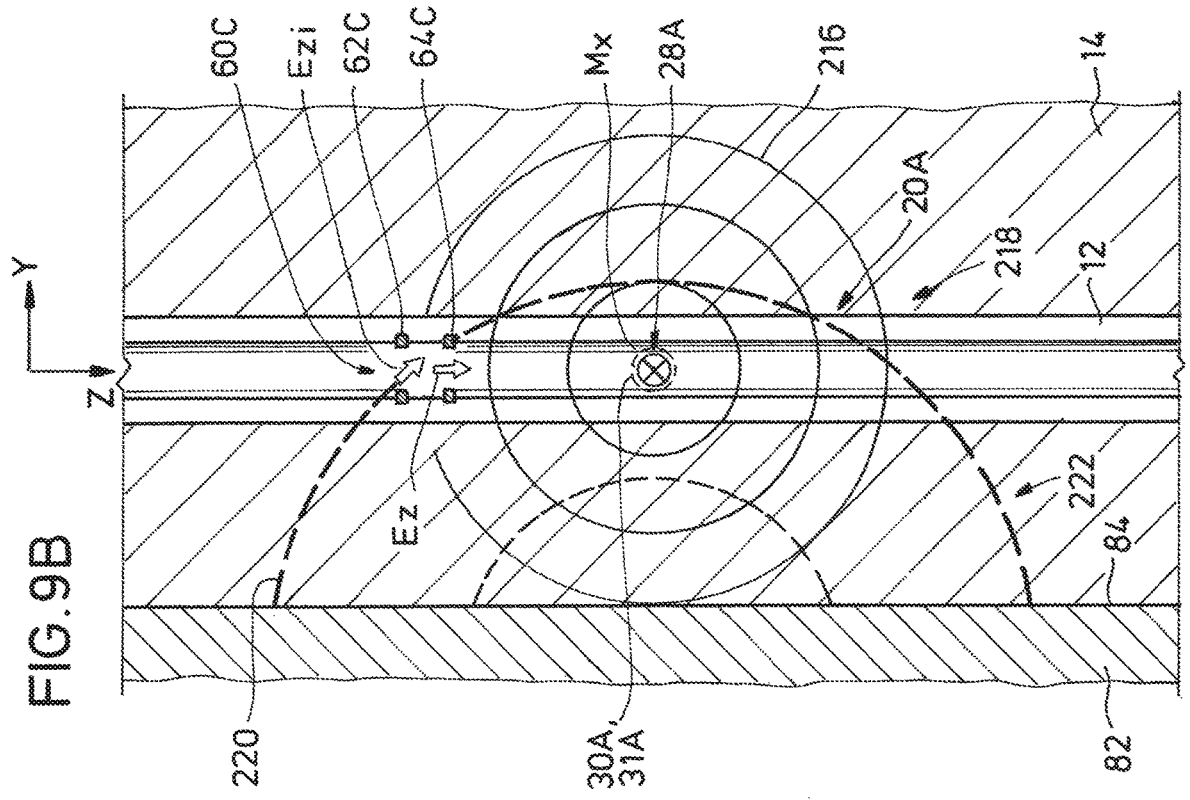
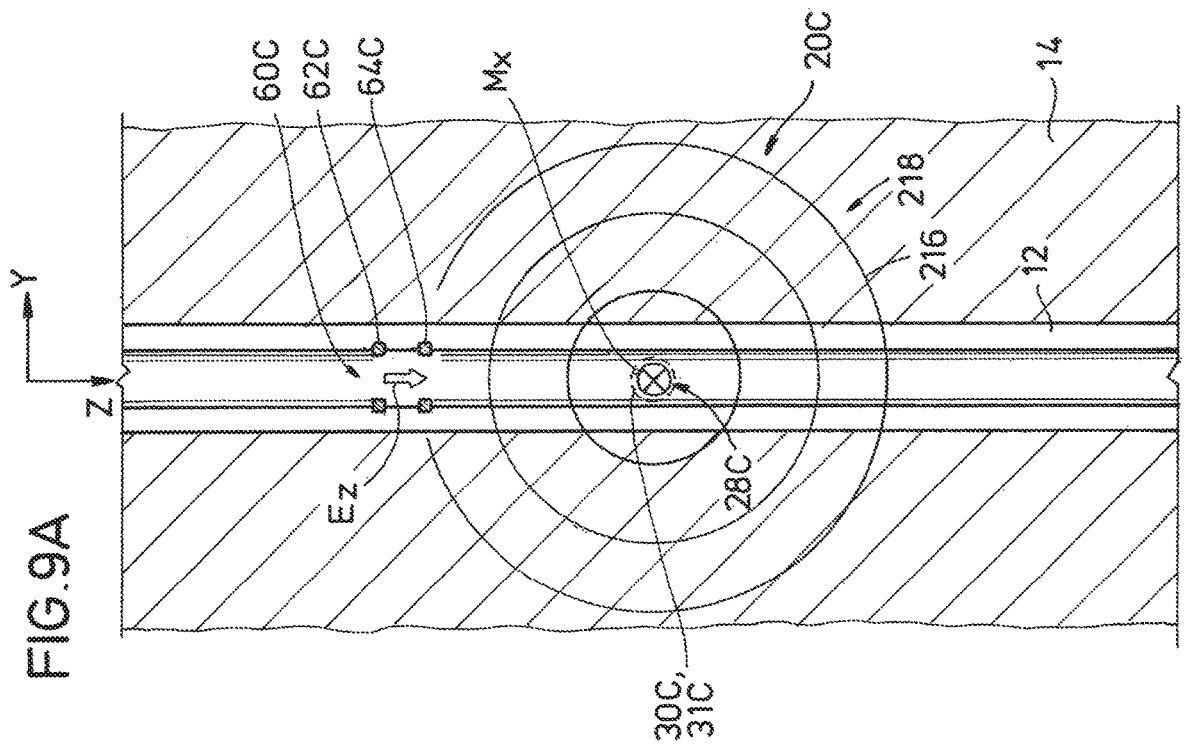

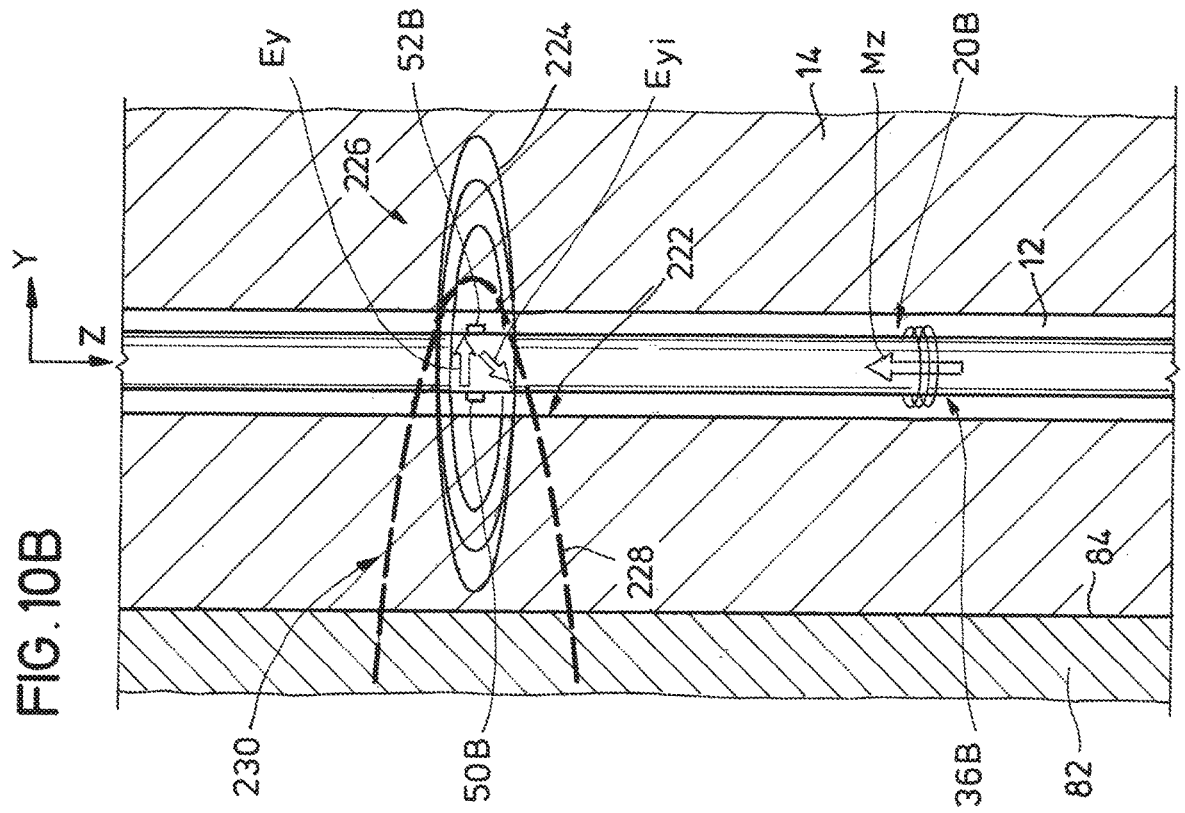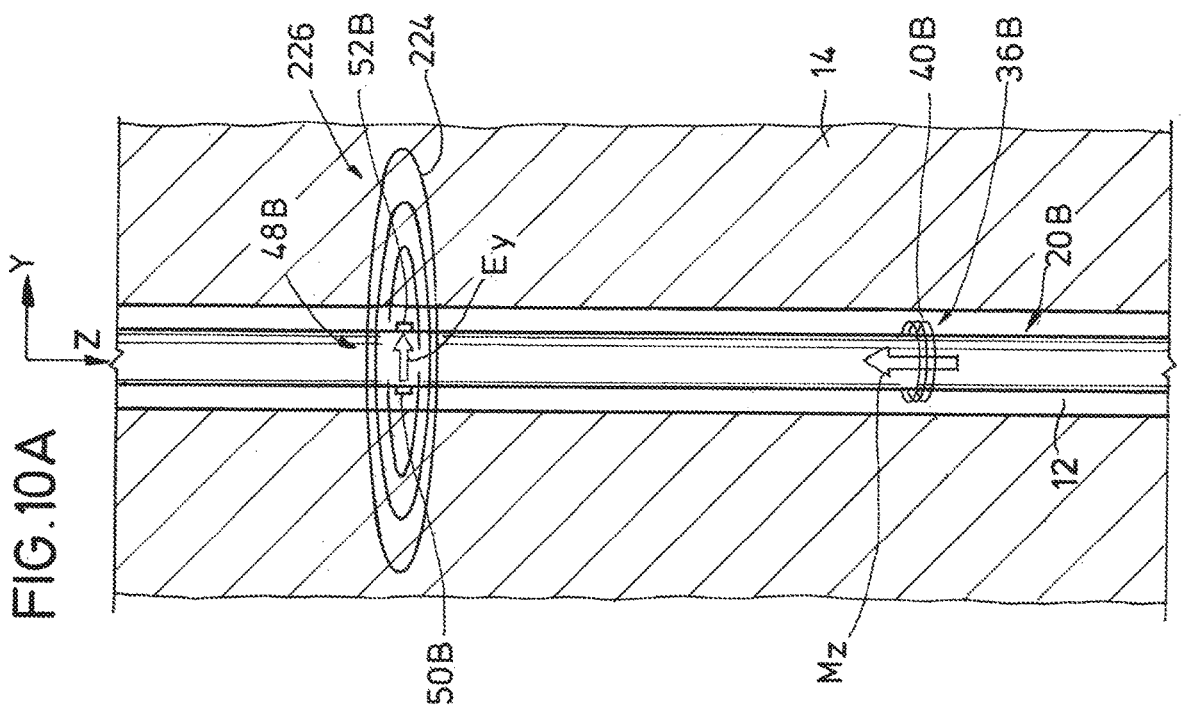

LOGGING TOOL WITH MAGNETIC SOURCE AND ELECTRIC DIPOLE SENSOR FOR FORWARD AND LATERAL IMAGING

BACKGROUND OF THE INVENTION

1. Field of Invention

The present disclosure relates to imaging strata that is forward and lateral to an imaging device. More specifically, the present disclosure relates to a logging tool with a magnetic dipole source and an electric field sensor that images formation forward and lateral to the tool.

2. Description of Prior Art

A resistivity measurement is one typical subterranean formation evaluation procedure where a log of the resistivity adjacent a wellbore is measured. Formation resistivity is a function of any fluids trapped within the subterranean formation. Thus resistivity is often measured to identify where water and/or hydrocarbon are present in the formation. Changes in resistivity in a subterranean formation can be abrupt and define a bed boundary. Resistivity can be measured with a wireline tool or a logging while drilling (LWD) tool. Measuring resistivity with a galvanic (DC) resistivity device typically involves forming an electrical potential in the formation and measuring a voltage between voltage measuring electrodes of the device. In an induction measurement device, magnetic flux/magnetic field is induced in the formation by the current in the transmitter; which induces a measured voltage in a receiver of the tool spaced axially from the transmitter. During LWD operations, there is a desire to "look ahead" so as to avoid drilling across bed boundaries or faults, as well as any subterranean geological hazard.

Induction-type logging tools have been used to measure formation resistivity as the in-phase response of an induction log is approximately proportional to the formation conductivity. Generally, the in-phase response is much weaker compared to the out-of-phase inductive response, so backing coils are used to suppress the out-of-phase signal. The propagation tool for LWD and geosteering operations, the formation resistivity is measured by the phase difference and the attenuation of responses between a pair of receivers. In geosteering operations, the resistivity measurement is sometimes used to detect a bed boundary and help estimate the distance to the bed boundary. Usually though identifying the bed boundary is a primary concern in geosteering operations rather than obtaining the resistivity measurement. The bed boundary can be detected and estimated more easily by using the stronger out-phase response in an induction type tool, or the response at a single receiver in LWD propagation tool. For example, the cross component response between an orthogonal pair of axial transmitter and transverse receiver can detect the bed boundary around the tool. However, the sensitivity to the distance to the bed in the primary response diminishes once the distance exceeds roughly about the length of transmitter-receiver offset.

SUMMARY OF THE INVENTION

Described herein is an example of a method of operations in a borehole, and which include generating a magnetic field in the borehole having a magnetic dipole oriented transverse to an axis of the borehole and that induces an electric field, sensing information about the electric field in a first direction that substantially coincides with an axis of the borehole, sensing information about the electric field in a second direction that is substantially transverse to the first direction and transverse to the magnetic dipole, and identifying a target formation based on information sensed from the electric field. Examples exist where the target formation is spaced axially away from the magnetic dipole, or radially away from the magnetic dipole. In an alternative, the information about the electric field in the first direction is sensed with a first sensor, and wherein the information about the electric field in the second direction is sensed with a second sensor that is collocated with the first sensor. In one alternative, the step of sensing information about the electric field in a first direction includes obtaining a first magnitude of the electric field at a first location in the borehole, obtaining a second magnitude of the electric field at a second location in the borehole, and comparing the first and second magnitudes, and wherein a location of the target formation is obtained based on comparing the first and second magnitudes. The step of sensing information about the electric field in a second direction optionally includes obtaining a first magnitude of the electric field at a first location in the borehole, obtaining a second magnitude of the electric field at a second location in the borehole, and comparing the first and second magnitudes, and wherein a location of the target formation is obtained based on comparing the first and second magnitudes. Embodiments exist where the information about the electric field in a first direction is a difference in electrical potential between two axially spaced apart locations in the borehole, and wherein an electrode ring is disposed at each of the two axially spaced apart locations. In an example, the information about the electric field in a second direction is made up of a difference in electrical potential between two radially spaced apart locations in the wellbore, and wherein an electrode is disposed at each of the two radially spaced apart locations.

Another example method of operations in a borehole includes generating a magnetic field in the borehole having a magnetic dipole, measuring a characteristic of an electric field induced by the magnetic field, and identifying a target formation based on the step of measuring electric potential. Embodiments exist where the characteristic of the electric field is electric potential, and which is measured at two spaced apart locations that are intersected by a path extending transverse to the magnetic dipole. In one example, the magnetic dipole is oriented transverse to an axis of the wellbore, and the path is oriented transverse to the axis. Optionally, the magnetic dipole is oriented transverse to an axis of the wellbore, and the path is oriented parallel with the axis. Alternatively, the path is a first path, and wherein the measurement of electric potential is a first measurement, the method further including obtaining a second measurement of electric potential that is measured at two spaced apart locations that are disposed along a second path which is oriented parallel with the axis. In a further example, the magnetic dipole is oriented parallel to an axis of the wellbore, and the path is oriented transverse to the axis. In one example embodiment, the magnetic field is a first magnetic field and the magnetic dipole is a first magnetic dipole, the method further including generating a second magnetic field having a second magnetic dipole, and wherein the second magnetic dipole is oriented substantially parallel with the axis.

Also disclosed herein is an example of a tool for use in a borehole and that includes a housing having an axis, a means for forming a magnetic field having a magnetic dipole that is oriented transverse to the axis, a means for sensing a characteristic of an electric field generated by the magnetic field, and a means for identifying the presence of a target formation based on the sensed characteristic of the electric field. Optionally, the means for sensing a characteristic of the electric field measures a change of electrical potential of the electric field over a distance in a direction that is transverse to the magnetic dipole. In one embodiment, the means for sensing a characteristic of the electric field measures a change of electrical potential of the electric field over a distance in a direction that is parallel with the axis. Further optionally, the means for sensing a characteristic of the electric field measures a change of electrical potential of the electric field over a distance in a direction that is transverse to the magnetic dipole, and measures a change of electrical potential of the electric field over a distance in a direction that is parallel with the axis. In an alternate embodiment, the magnetic field is a first magnetic field, the magnetic dipole is a first magnetic dipole, and the means for forming a magnetic field includes a first means for forming a magnetic field, the tool further comprising a second means for forming a magnetic field, and which generates a second magnetic field having a second magnetic dipole, and which is oriented parallel with the axis.

BRIEF DESCRIPTION OF DRAWINGS

Some of the features and benefits of the present invention having been stated, others will become apparent as the description proceeds when taken in conjunction with the accompanying drawings, in which:

FIG. 3A is a side partial sectional view of an alternate embodiment of a portion of the logging tool of FIG. 1, and having a transverse magnetic dipole source, and an orthogonal electric field sensor.

FIG. 3B is a side partial sectional view of an alternate embodiment of a portion of the logging tool of FIG. 1, and having an axial magnetic source, and an orthogonal electric field sensor.

FIGS. 8A, 9A, and 10A are partial sectional views of examples of downhole tools imaging a homogenous formation.

FIGS. 8B, 9B, and 10B are sectional views of examples of the tools of FIGS. 8A, 9A, and 10A respectively approaching formation changes.

Figure 4:
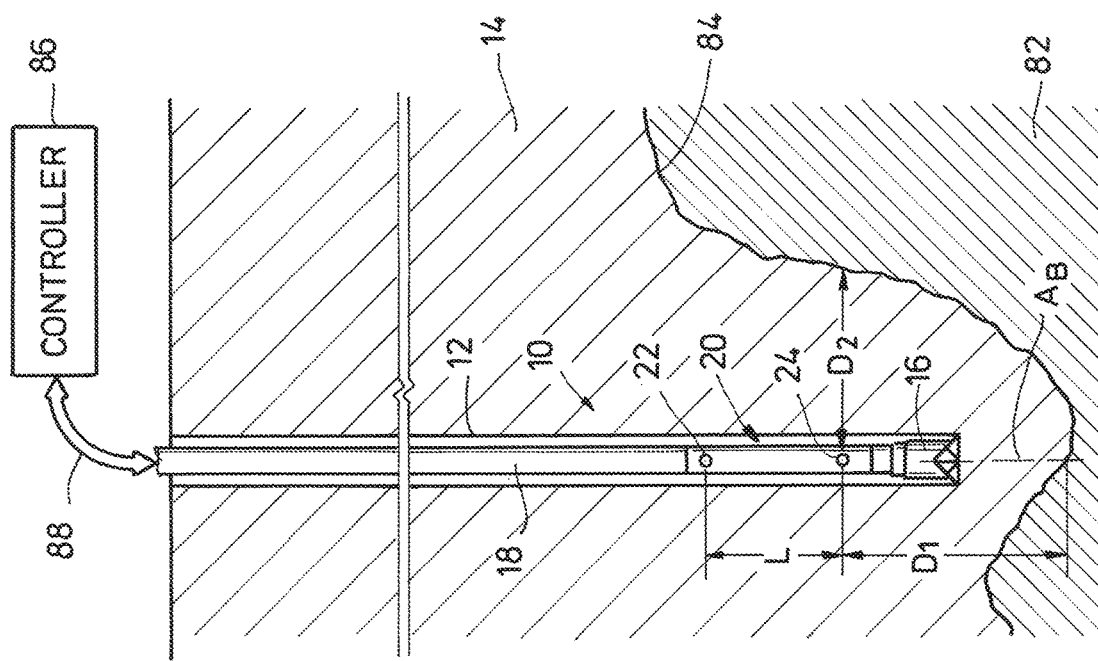
FIG. 4 is a sectional view of an example of the drilling system and logging tool of FIG. 1 encountering a bed boundary.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about", "substantially", and "generally" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
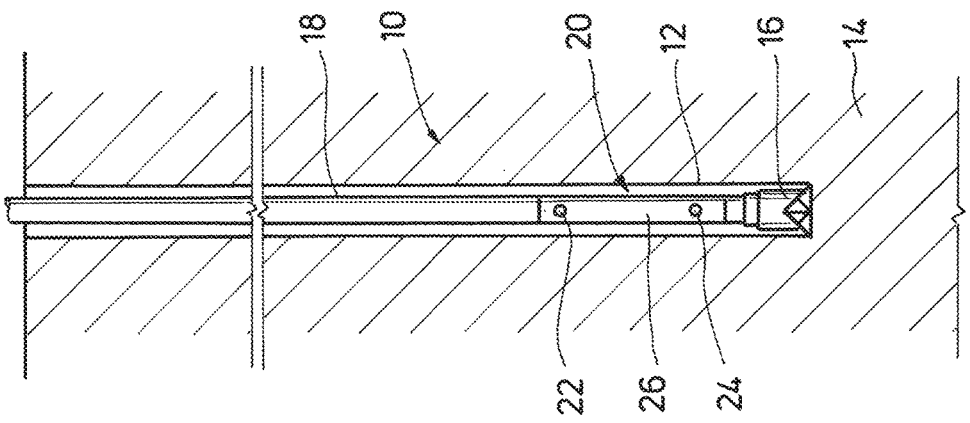
FIG. 1 is a sectional view of an example of a drilling system forming a wellbore in a formation, and a logging tool for imaging the formation.

Shown in a side partial sectional view in FIG. 1 is an example of a drilling system 10 forming a wellbore 12 through a formation 14. Included with the drilling system 10 is a drill bit 16 shown disposed on a lower end of a drill string 18, and wherein an imaging tool 20 is shown provided within the drill string 18. The imaging tool 20 includes transducers 22, 24 shown within a housing 26. Generally, axis $A_Z$ of housing 26 is substantially parallel with axis $A_B$ of wellbore 12. As described in more detail below, one of the transducers 22, 24 generates a signal in the form of an electromagnetic field within the formation 14, and that is then sensed by another one of the transducers 22, 24. Further, variations in the electromagnetic field provide indications of characteristics within formation 14, such as a boundary to an adjacent formation or subterranean structure. Examples exist wherein one or more of transducers 22, 24 include a sensor for sensing a signal, a transmitter for transmitting a signal, or both. In one embodiment, the sensor includes a receiver. In an alternative, one of transducers 22, 24 includes a transmitter, and the other of the transducers 22, 24 includes a sensor.

Figure 2A:
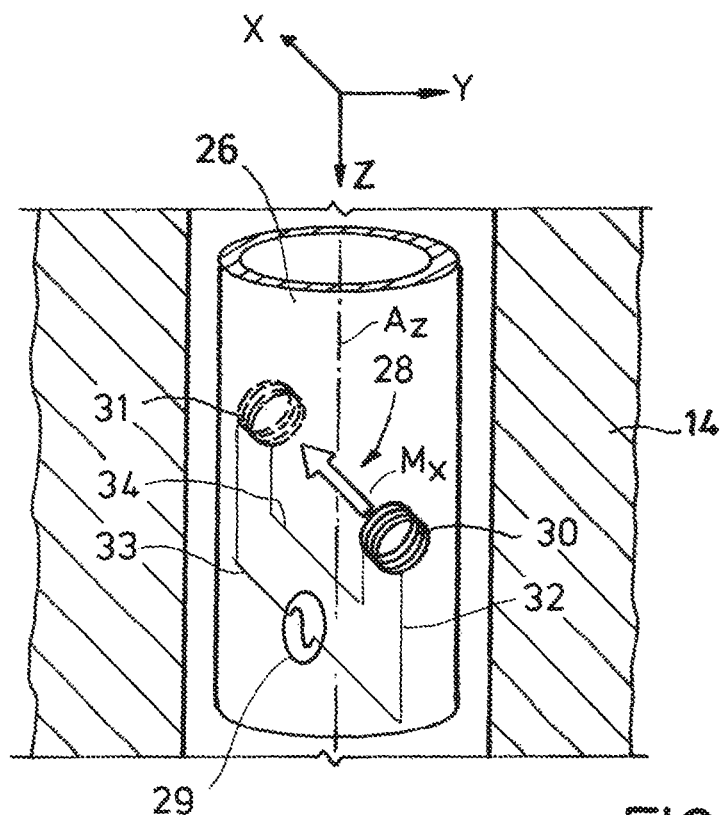
FIG. 2A is a side partial sectional perspective view of an example of a transverse magnetic dipole source.

FIGS. 2A through 2D illustrate optional examples of the transducers 22, 24 of FIG. 1. In the example of FIG. 2A shown is one embodiment of a transverse magnetic dipole source 28 which is powered by a power source 29. While depicted as an alternating current power source, embodiments exist where power source 29 generates and/or provides any form of electromagnetic energy. The embodiment of the magnetic dipole source 28 of FIG. 1 includes coils 30, 31 that are illustrated 180 degrees apart from one another and within housing 26. Lines 32, 33 provide electrical communication between 30, 31 and power source 29, and coils 30, 31 are in communication via line 34. In this example and as described in more detail below, when the coils 30, 31 are energized a magnetic field is generated having a magnetic dipole $M_X$ shown as being transversely oriented and along a path coinciding with the X-axis of the illustrated coordinate system.

Figure 2B:
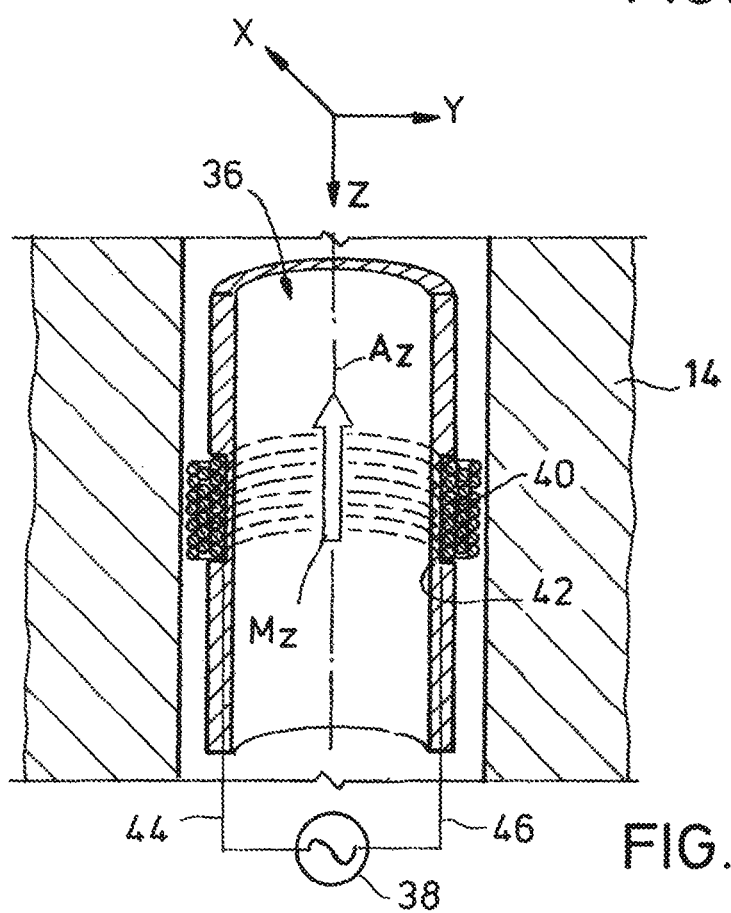
FIG. 2B is a side partial sectional perspective view of an example of an axial magnetic dipole source.

Illustrated in FIG. 2B is an example of an axial magnetic dipole source 36 that is selectively powered by power source 38. While depicted as an alternating current power source, embodiments exist where power source 38 generates and/or provides any form of electromagnetic energy. Further included with axial magnetic source 36 of FIG. 2B is an elongated conductive member circumscribing a portion of an outer surface of housing 26, and which defines winding 40. In the illustrated example, winding 40 is disposed in an optional recess 42 formed into an outer surface of housing 26 along a portion of an axial length of housing 26. In a non-limiting example of operation, and as described in more detail below, a magnetic field is generated by energizing winding 40 with power source 38 via lines 44, 46, magnetic field includes a magnetic dipole $M_Z$ shown as being axially oriented with regard to housing 26, and along a path coinciding with the Z-axis of the illustrated coordinate system.

Figure 2C:
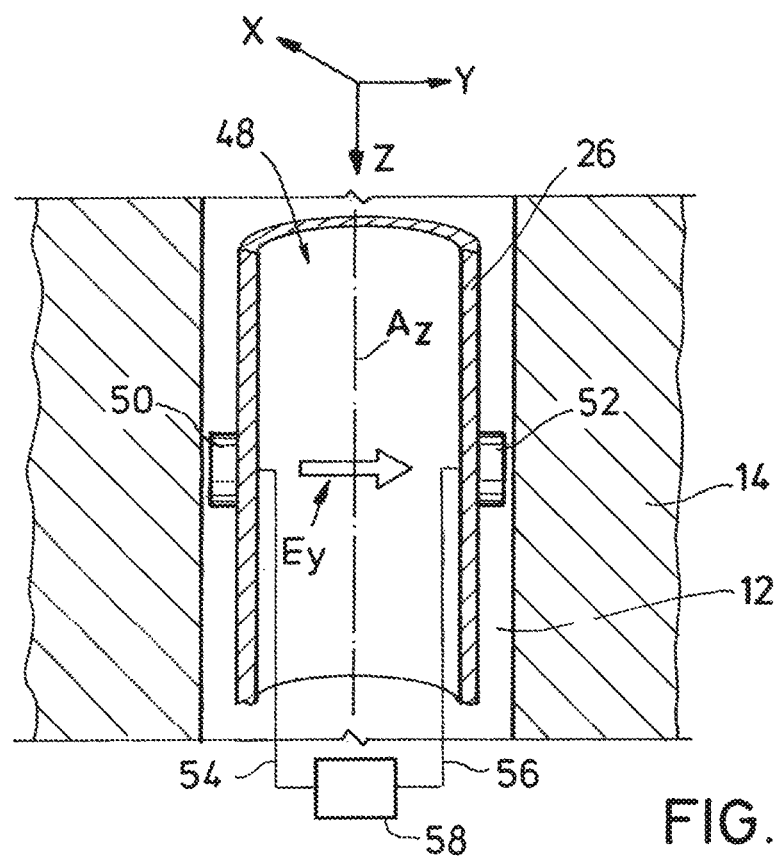
FIG. 2C is a side partial sectional perspective view of an example of a transverse electric field sensor.

Shown in FIG. 2C is an example of an orthogonal electric field sensor 48, which includes electrodes 50, 52 spaced radially outward from axis $A_Z$. Elongate lines 54, 56 formed from electrically conductive material are shown respectively connected to electrodes 50, 52. Monitoring differences in electrical potential between electrodes 50, 52 yields information about an electric field proximate the electrodes 50, 52, which in an example is generated by magnetic dipole source, such as those described above. As shown, electrodes 50, 52 are strategically located to detect an electric field $E_Y$ oriented in a direction orthogonal to the axis $A_Z$ of the housing 26. In an embodiment, electrodes 50, 52 are disposed about 180° from one another about axis $A_Z$, and at substantially the same axial location along axis $A_Z$. Electrodes 50, 52 are shown mounted onto housing 26, but can be disposed within sidewall of housing 26, or inside housing 26. In an alternative, orthogonal electric field sensor 48 includes an electrical meter 58 shown connected to ends of lines 54, 56 distal from electrodes 50, 52. In this alternative, meter 58 monitors electric potential at electrodes 50, 52 to measure an electric field.

Figure 2D:
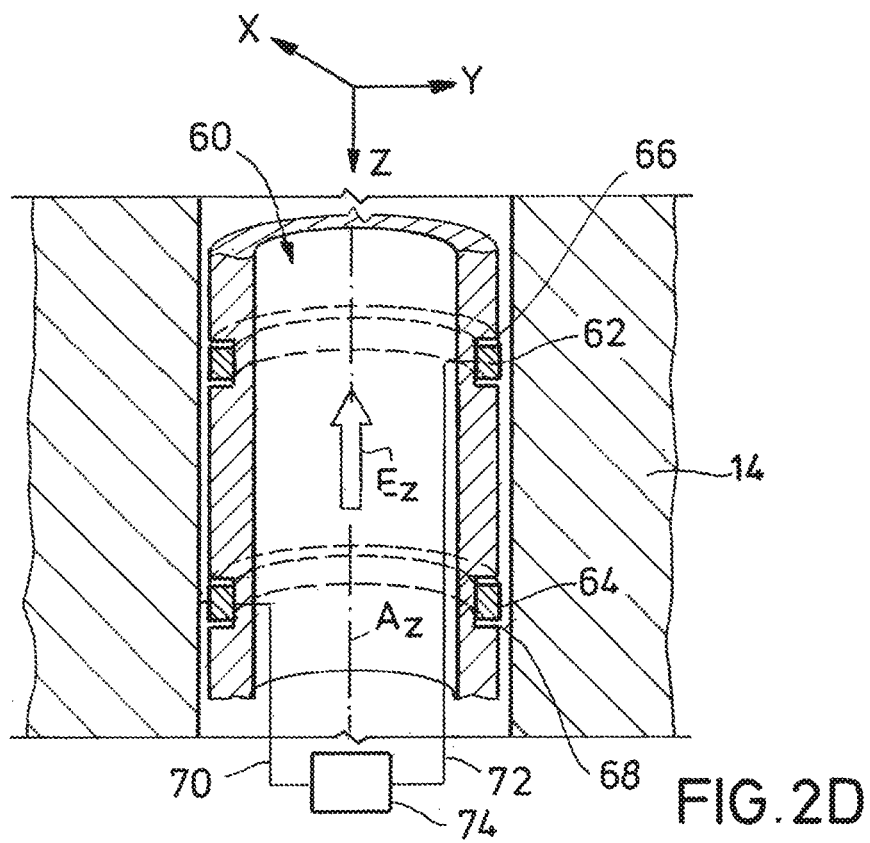
FIG. 2D is a side partial sectional perspective view of an example of an axial electric field sensor.

Illustrated in FIG. 2D is one example of an axial electric field sensor 60 which includes ring electrodes 62, 64 shown axially spaced apart from one another and circumscribing an outer surface of housing 26. Ring electrodes 62, 64 are optionally disposed within housing 26, or in recesses 66, 68 shown that are formed along an outer surface of housing 26 and circumscribing axis $A_Z$. In an embodiment, insulation (not shown) is selectively provided along the outer surface of ring electrodes 62, 64. While the portions of the ring electrodes 62, 64 depicted in the side sectional view of FIG. 2D extend less than 360° around axis $A_Z$, in this example the ring electrodes 62, 64 substantially circumscribe housing 26. In an alternate embodiment, electrodes (not shown) similar to electrodes 50, 52 of FIG. 2C are provided in lieu of the ring electrodes 62, 64 and disposed at angularly spaced apart locations about axis $A_Z$. Elongate lines 70, 72 formed from electrically conductive material are shown respectively connected to ring electrodes 62, 64. Monitoring differences in electric potential between ring electrodes 62, 64 yields information about an electric field proximate the ring electrodes 62, 64, which in an example is generated by magnetic dipole source, such as those described above. As shown, ring electrodes 62, 64 are strategically located to detect an electric field $E_Z$ oriented in accordance with axis $A_Z$ of the housing 26. An optional electrical meter 74 is included with axial electric field sensor 60, and which connects to ends of lines 70, 72 distal from ring electrodes 62, 64. In this alternative, meter 74 monitors electric potential at ring electrodes 62, 64 to measure an electric field.

An alternate example of imaging tool 20A disposed in wellbore 12 is provided in FIG. 3A. Here the transverse magnetic dipole source 28A with its coils 30A, 31A are shown forming a magnetic field having a magnetic dipole $M_X$. Also included with the illustrated embodiment of the imaging tool 20A is orthogonal electric field sensor 48A with its electrodes 50A, 52A oriented to sense electric field $E_Y$ that is induced by the magnetic dipole source. In the illustrated example, sensor 48A is disposed a distance $L_A$ from transverse magnetic dipole source 28A. As will be described in more detail below, the configuration of the imaging tool 20A of FIG. 3A is useful for imaging characteristics and changes of the formation 14 in portions of formation 14 that are spaced along axis $A_Z$ of housing 26A.

Shown in FIG. 3B is another embodiment of imaging tool 20B equipped with an axial magnetic dipole source 36B (shown as winding or coil 40B), and an orthogonal electric field sensor 48B spaced a distance $L_B$ away from the axial magnetic dipole source 36B. As discussed above, energizing axial magnetic dipole source 36B generates a magnetic field having a magnetic dipole $M_x$ oriented substantially transverse to axis $A_Z$ of housing 26B. Included with the orthogonal electric field sensor 48B are radially spaced apart electrodes 50B, 52B oriented to sense electric field $E_y$, which is generated by axial magnetic dipole source 36B.

Figure 3C:
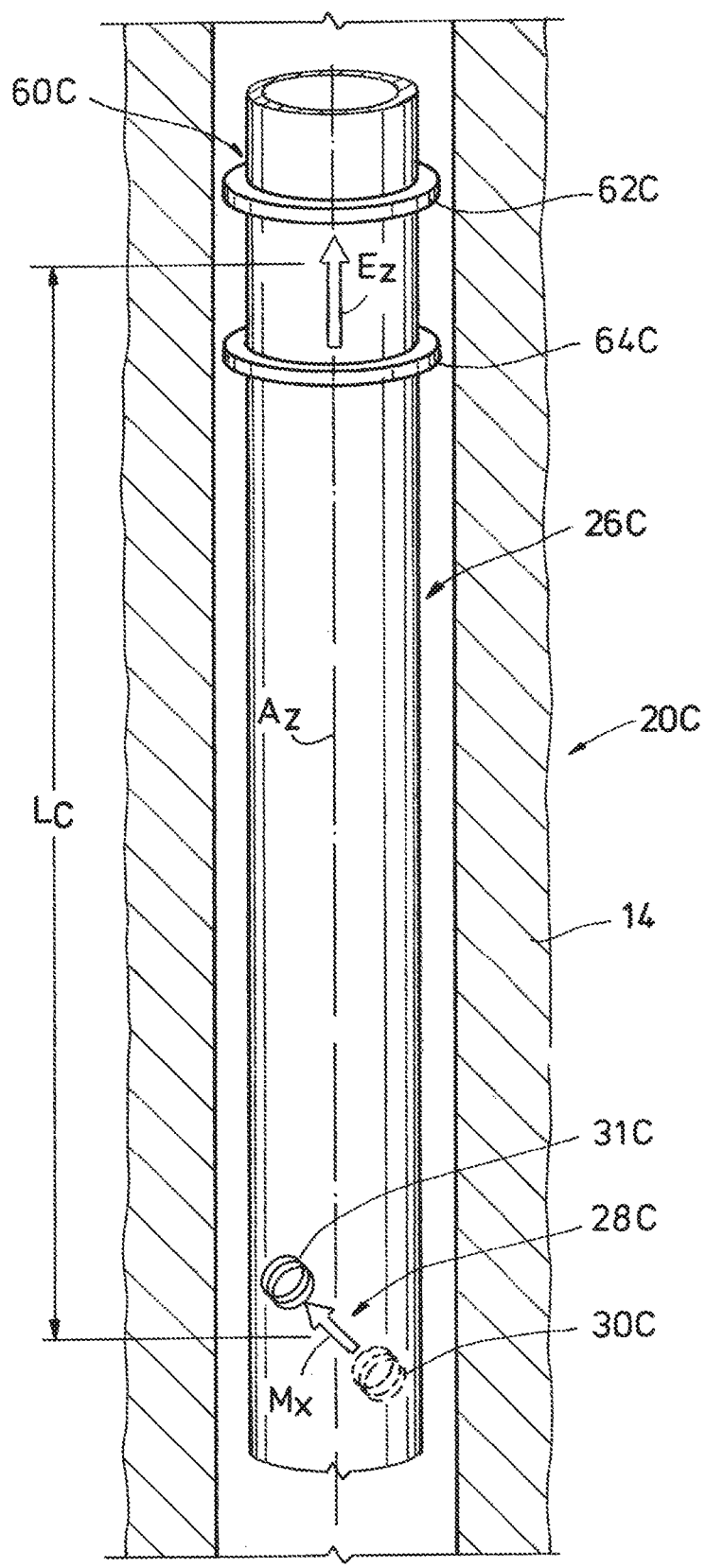
FIG. 3C is a side partial sectional view of an alternate embodiment of a portion of the logging tool of FIG. 1, and having a transverse magnetic dipole source, and an axial electric field sensor.

Depicted in FIG. 3C is another example of an imaging tool 20C, and which includes transverse magnetic dipole source 28C having coils 30C, 31C that when energized form a magnetic field with a magnetic dipole $M_X$, and which is shown oriented in a direction transverse to axis $A_Z$ of housing 26C. Also included with imaging tool 20C is an axial electric field sensor 60C, with electrode rings 62C, 64C. Transverse magnetic source 28C is spaced a distance $L_C$ away from axial electric field sensor 60C. Electrode rings 62C, 64C circumscribe axis $A_Z$, and accordingly sense electrical current flowing along the path represented by electric field $E_Z$.

Figure 3D:
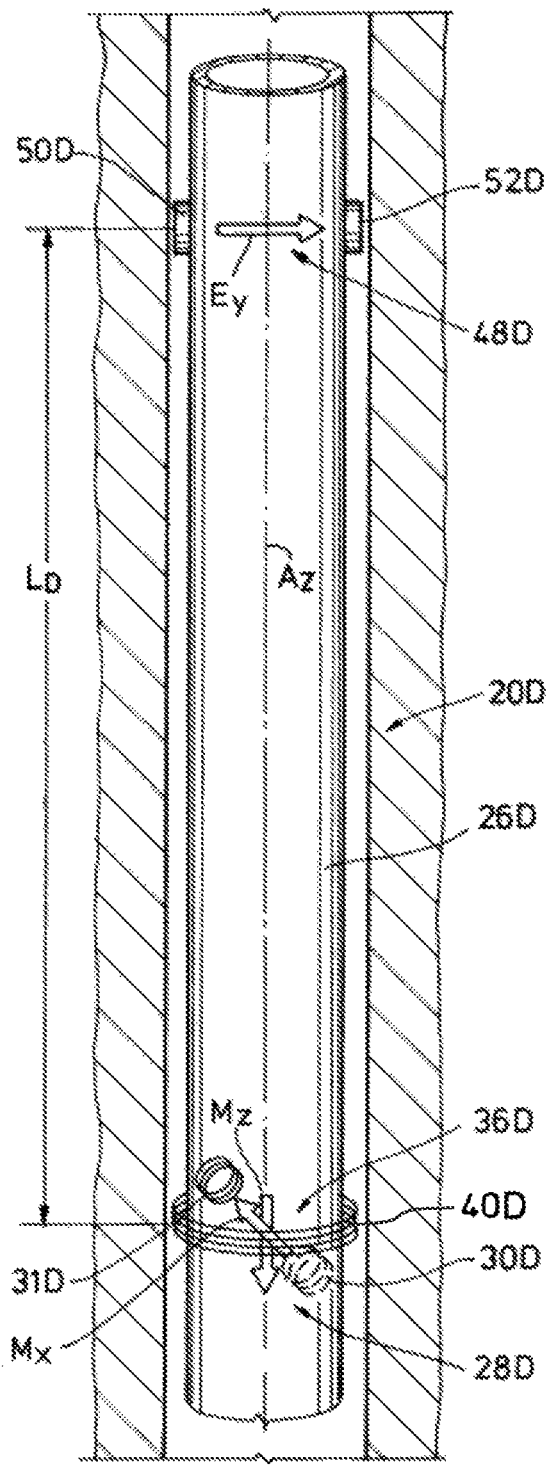
FIG. 3D is a side partial sectional view of an alternate embodiment of a portion of the logging tool of FIG. 1, and having collocated transverse and axial magnetic dipole sources with an orthogonal electric field sensor.

Shown in a side partial sectional view in FIG. 3D is another alternate example of imaging tool 20D equipped with collocated examples of transverse and axial magnetic dipole sources 28D, 36D. Magnetic fields having magnetic dipoles $M_X$, $M_Z$ are generated respectively by energizing coils 30D, 31D and coil 40D of the transverse and axial magnetic sources 28D, 36D. An orthogonal electric field sensor 48D is shown with the tool 20D and located a distance $L_D$ from sources 28D, 36D along axis $A_Z$ of housing 26D, and with electrodes 50D, 52D configured to sense orthogonally oriented electric field $E_Y$.

Figure 3E:
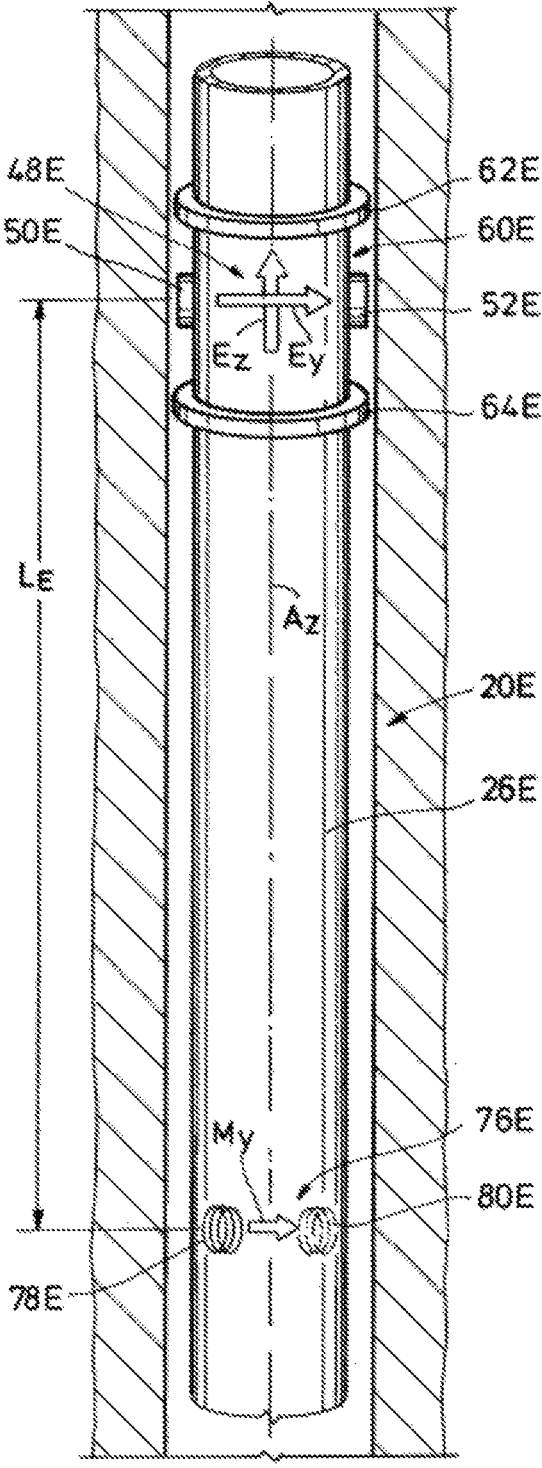
FIG. 3E is a side partial sectional view of an alternate embodiment of a portion of the logging tool of FIG. 1, and having an orthogonal magnetic dipole source with collocated axial and transverse electric field sensors.

In the example of FIG. 3E, shown in a side partial sectional view is another embodiment of imaging tool 20E and where orthogonal and axial electric field sensors 48E, 60E are collocated on housing 26E of tool 20E. In this example, orthogonal sensor 48E includes electrodes 50E, 52E, and axial electric field sensor 60E includes ring electrodes 62E, 64E. Disposed a distance $L_E$ from sensors 48E, 60E is an orthogonal magnetic dipole source 76E with coils 78E, 80E set radially apart from one another. Coils 78E, 80E circumscribe a line oriented orthogonal with axis $A_Z$. In one example, an orthogonal line is oriented 90° from axis $A_Z$ and 90° from a transverse line, where transverse line is also oriented 90° from axis $A_Z$. Energizing coils 78E, 80E forms a magnetic field having a magnetic dipole My shown oriented in a direction orthogonal to axis $A_Z$. Sensors 48E, 60E are configured to monitor orthogonal and axially oriented electric fields $E_Y$, $E_Z$ generated by magnetic dipole source 76E.

FIG. 4 shows further example of the drilling system 10 extending wellbore 12 and where the imaging tool 20 is approaching a formation 82 having characteristics that are different from formation 14. Examples of characteristics that are different in the two formations 14, 82 include permeability, dielectric constant, and resistivity, to name a few. The interface between formations 14, 82 defines a bed boundary 84 which is shown a distance D1 from transducer 24 and along axis $A_B$ of the wellbore 12. Additionally, the transducer 24 is illustrated as being a distance D2 from bed boundary 84 along a distance that extends radial to the wellbore 12. In a non-limiting example of operation, transducer 24 is made up of one or more of the sources of FIGS. 2A, 2B, and 3A-3E, and transducer 22 is made up of one or more of the sensors of FIGS. 2C, 2D, and 3A-3E. By selectively energizing the sources from FIGS. 2A, 2B, and FIGS. 3A through 3E, and then sensing the resulting electric fields in the formation 14, the location of bed boundary 84 with respect to imaging tool 20 can be identified, and also the distances D1, D2 estimated. Accordingly, with this information at hand, operators of the drilling system 10 can take actions to avoid the bed boundary 84. Optionally, the imaging information can be accessed to purposefully intersect the bed boundary 84 with the drilling system 10.

Further illustrated in FIG. 4 is an example of a controller 86 that is in communication with all embodiments of the transducers 22, 24 (shown in FIGS. 2A-2D and FIGS. 3A-3E) via communication means 88. As such, the readings obtained by the transducers 22, 24 is processed within a processing unit of controller 86 and the information regarding bed boundary 84 is calculated. Software for performing these functions can be installed on the controller 86 or provided by another source having a readable medium. Examples exist where the controller 86 is also in communication with one or more of the power sources 29, 38 (FIGS. 2A and 2B) so that selective dipole sources can be energized. Controller 86 can optionally be disposed within tool 20. Alternatives exist where data is stored within memory (not shown) disposed in tool 20 and retrieved after tool 20 is removed from wellbore 12. Meters 58, 74 (FIGS. 2C and 2D) are optionally in communication with, or included with, controller 86 to relay data gathered by sensors 48, 60 to controller 86.

Figure 5A:
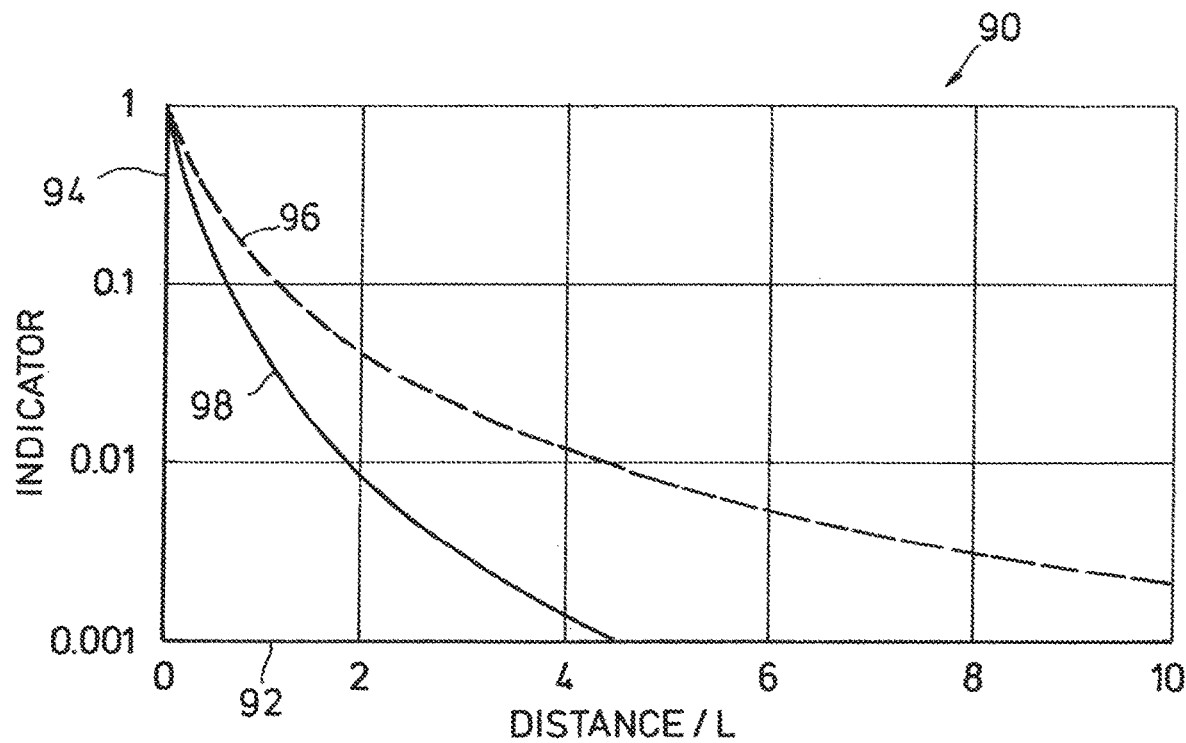
FIGS. 5A-5C are graphs with plots formed with values of signal deviation versus distance of known and presently disclosed transducer configurations.

Referring to FIG. 5A, shown is an example of graph 90 having an abscissa 92 that represents a ratio of distances from the dipole source to a bed boundary 84, and a length between the dipole source and sensor on the imaging tool 20. The ordinate 94 of graph 90 represents detected changes in magnitude of magnetic flux response and electric field response sensed by the sensors. Graph 90 was generated by setting the magnetic flux response as $B_i(D)=B_i^0(1+\delta_i(D))$, where $B_i^0$ is the receiver response in the homogenous formation of conductivity σ, and $\delta_i(D)$ is an indicator of an approaching boundary for i='coaxial' and 'coplanar' measurements. Similarly, the transverse electric field response is noted as: $E_y(D)=E_y^0(1+\delta_{electric}(D))$, where $E_y^0$ is the sensed response in the homogeneous formation and $\delta_{electric}(D)$ is an indicator of an approaching boundary. Here, line 96 is based on prophetic data that represents a transverse electrical field generated by a magnetic dipole source that is transverse to an axis of the proposed tool or borehole. Also in graph 90 is line 98 which is based on prophetic data from a known tool (not shown) having a magnetic dipole source and magnetic flux sensor both coaxial with the tool body, and another known tool (not shown) having a magnetic dipole source and a magnetic flux sensor that are both transverse to an axis of tool body. An advantage of the presently disclosed system is evident from the results of FIG. 5A is that the indication of a bed boundary is evident at a one percent difference, and at a distance over that twice that of the known coaxial/transverse system of detecting bed boundaries. Further, in the example of FIG. 5A, the distances evaluated are those along the axis of borehole, and what is referred to herein as the looking ahead value.

Figure 5B:
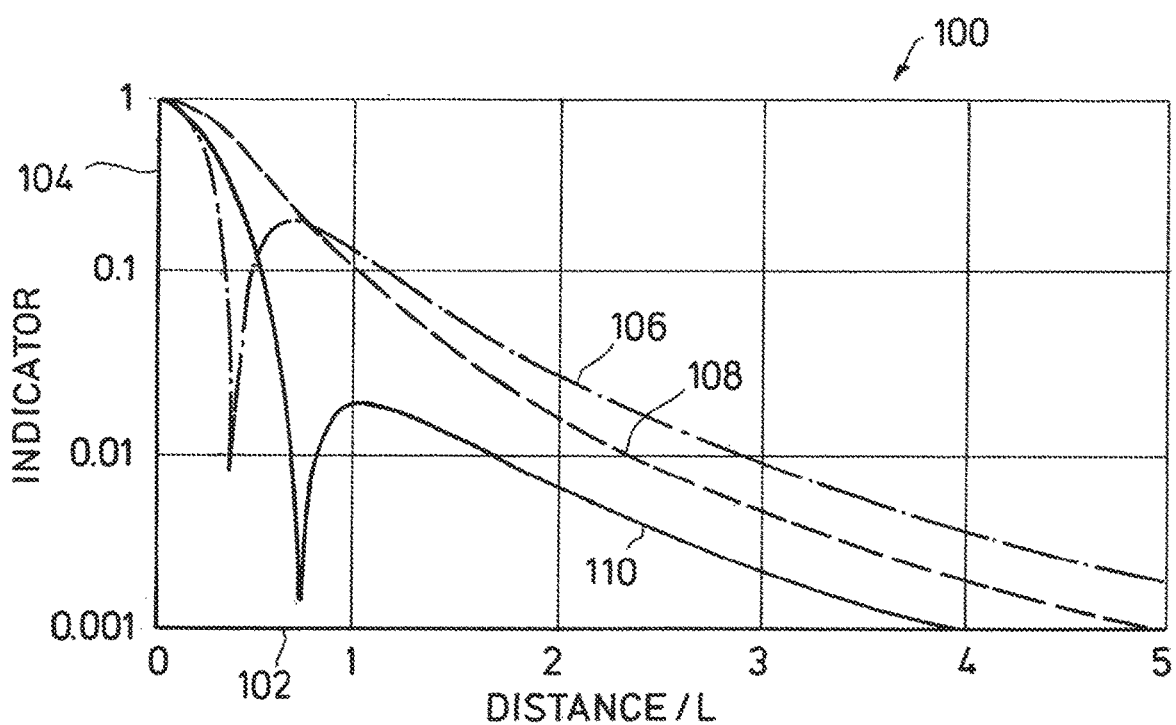

Shown in FIG. 5B is a graph 100 having an abscissa 102 and ordinate 104 with the same representations of that of FIG. 5A. Lines 106, 108, 110 illustrate ratios of variations in magnetic flux measurement and electric field measurement as compared to a ratio between the detected bed boundary distance and sensor to source spacing. The example data used to generate FIG. 5B represent an instance where the bed boundary is a distance that is radial to an axis of the tool 20. This directional viewing is referred to herein as a "look around" application. Line 106 represents an example of sensing tool (not shown) where the magnetic dipole source and magnetic flux sensor that are coplanar with one another, which in this example would be that the dipoles are transverse to the tool body, and the dipole directions are pointing toward the distant formation. Line 108 represents an example of a tool (not shown) where the magnetic dipole source and magnetic flux sensor are coplanar with one another, which in this example would be that the dipoles are transverse to the tool body but the dipole directions are parallel to the distant formation. Line 108 also represents an example of tool 20A of FIG. 3A where the magnetic dipole source and electric field sensor are transverse to the tool body. Line 100 represents prophetic results taken from a tool (not shown) where the magnetic dipole source and the electric field sensor are coaxial.

However, there are other responses that may be useful for look-around detection. The cross-component magnetic flux responses, namely, the transverse magnetic flux response from the axial magnetic dipole source, and the axial magnetic flux response from the transverse magnetic dipole source; and which are zero in a homogenous formation. In an example these signals become detectable once the bed boundary is close to the tool. In one example, an indicator for cross component responses is defined by the following relationship: $B_{cross\text{-}component}(D)=B_{coplanar}^0 \delta_{cross\text{-}component}(D)$.

Figure 5C:
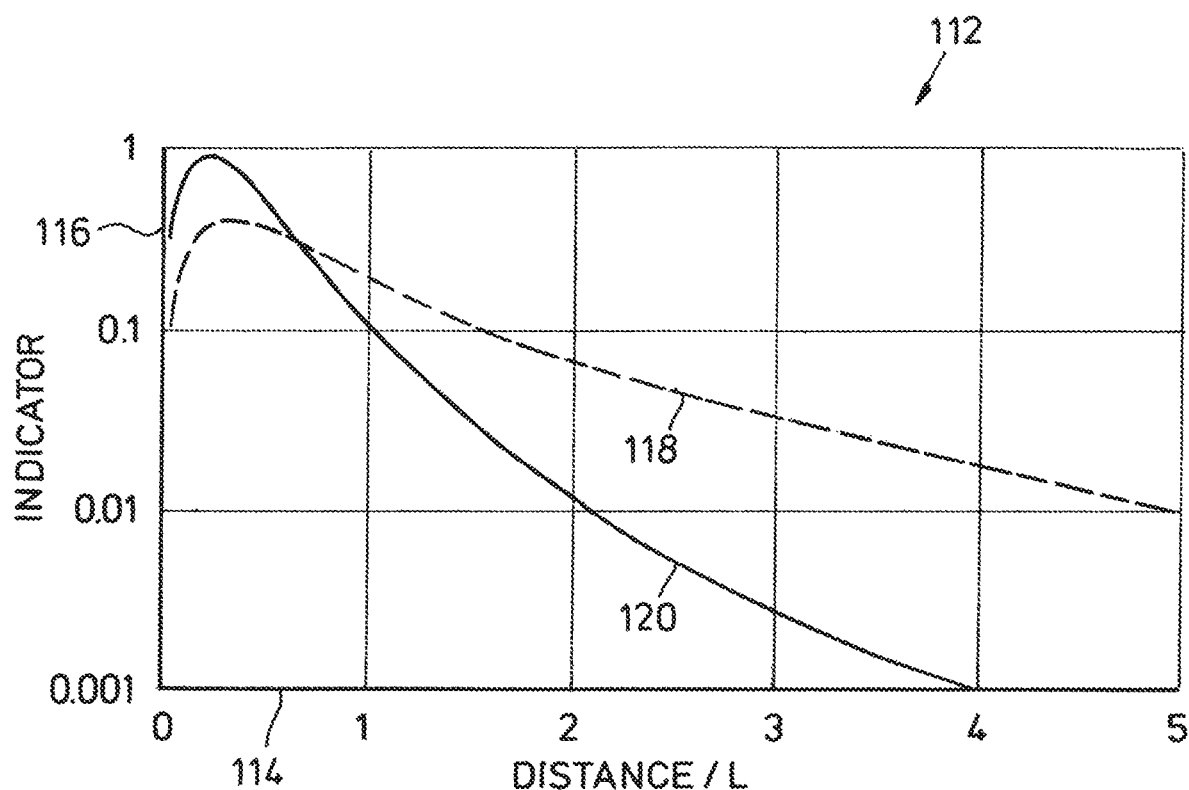

In an alternative, the transverse electric field response from the axial magnetic dipole source, and the axial electric field response from the transverse and parallel to the bed boundary magnetic dipole source, are also zero in a homogeneous formation. Examples exist where these responses become detectable for a nearby boundary sideway from the tool. In an embodiment, the indicator for this magnetic flux response is defined with respect to the transverse magnetic flux as: $E_{mag-axial}(D)=E_{transverse}° \delta_{mag-axial}(D)$. Illustrated in FIG. 5C is an example of a graph 112 whose abscissa 114 and ordinate 116 are the same as graphs 90, 100 from FIGS. 5A and 5B, respectively. Included on graph 112 is a line 118 that represents data obtained from a tool having transverse electric field sensor and axial magnetic dipole source. Also included with graph 112 is line 120 that represents data obtained from a known tool (not shown), wherein the known tool includes a cross component magnetic flux measurement.

As provided in FIG. 5C, the tool with the electric field sensor detects a 10% change in sensed response at a distance/L ratio of 5, whereas the cross-component sensor tool senses 10% change in sensed response at a distance/L ratio of 2. Thus the results of using the tool with the electric field sensor (line 118) provides sensitivity at greater distances for detecting the bed boundary than the tool with the cross-component sensor (line 120). Further, in FIG. 5C, the distances are in a look around application. It should be noted that the cross-component electrical field measurement of line 120 decays at a rate of $1/D^3$.

Figure 6A:
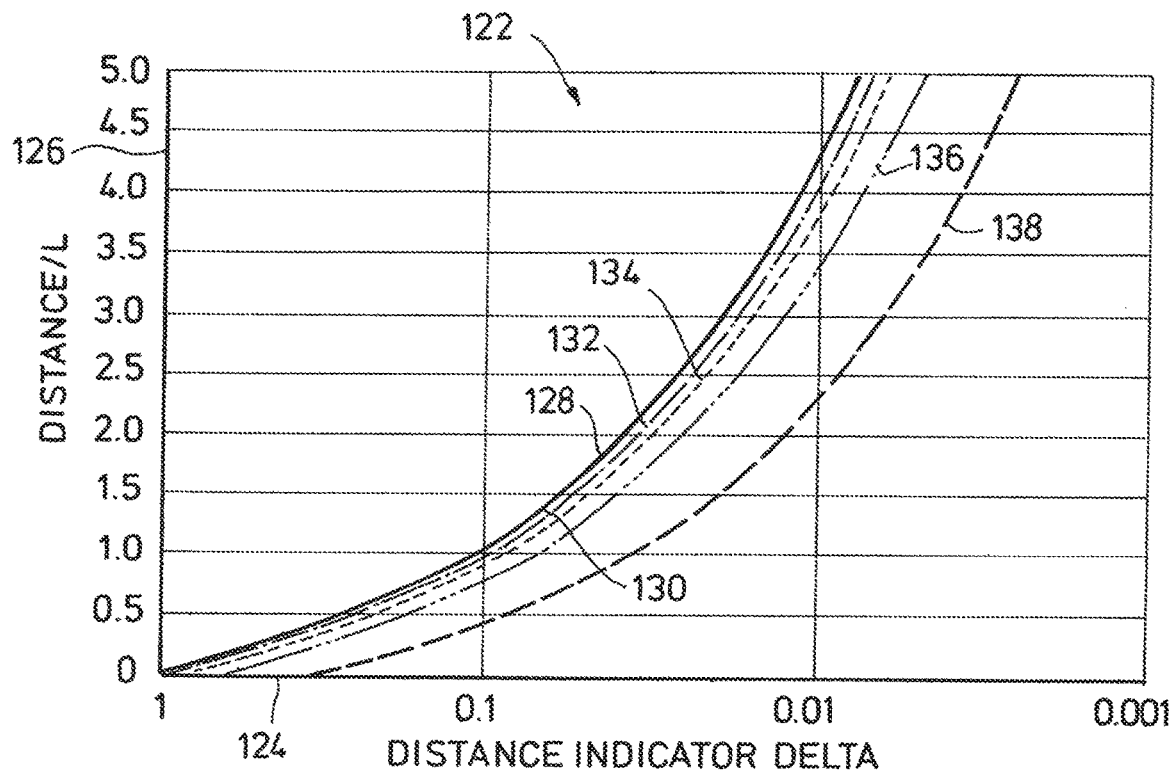
FIGS. 6A and 6B are graphs with plots formed with values of signal deviation versus distance of known and presently disclosed transducer configures for different conductivity ratios.

Referring now to FIG. 6A, shown is a graph 122 with an abscissa 124 that represents percent changes in the magnitude of an electric field sensed by a sensor in an imaging tool. The ordinate 126 of graph 122 represents a ratio of the distance to the bed boundary to a length of a spacing between a source and a sensor mounted on the tool. A series of curved lines 128, 130, 132, 134, 136, and 138 on graph 122 represent prophetic data taken over different ratios of resistivity between the formation of the target (formation on the side of the bed boundary opposite the imaging tool), over the resistivity of the formation in which the imaging tool is disposed. Line 128 represents values that would occur when the target formation is made up primarily of salt. Line 130 illustrates example data where the ratio of resistivity values is 100, line 132 represents a resistivity ratio of 20, line 134 represents a resistivity ratio of 10, line 136 illustrates a resistivity ratio of 5, and line 138 shows example data for a resistivity ratio of 2. Further, in FIG. 6A the distance is in a looking ahead direction, and the prophetic data was simulating assuming use of an imaging tool having parameters and characteristics similar to tool 20A of FIG. 3A.

Figure 6B:
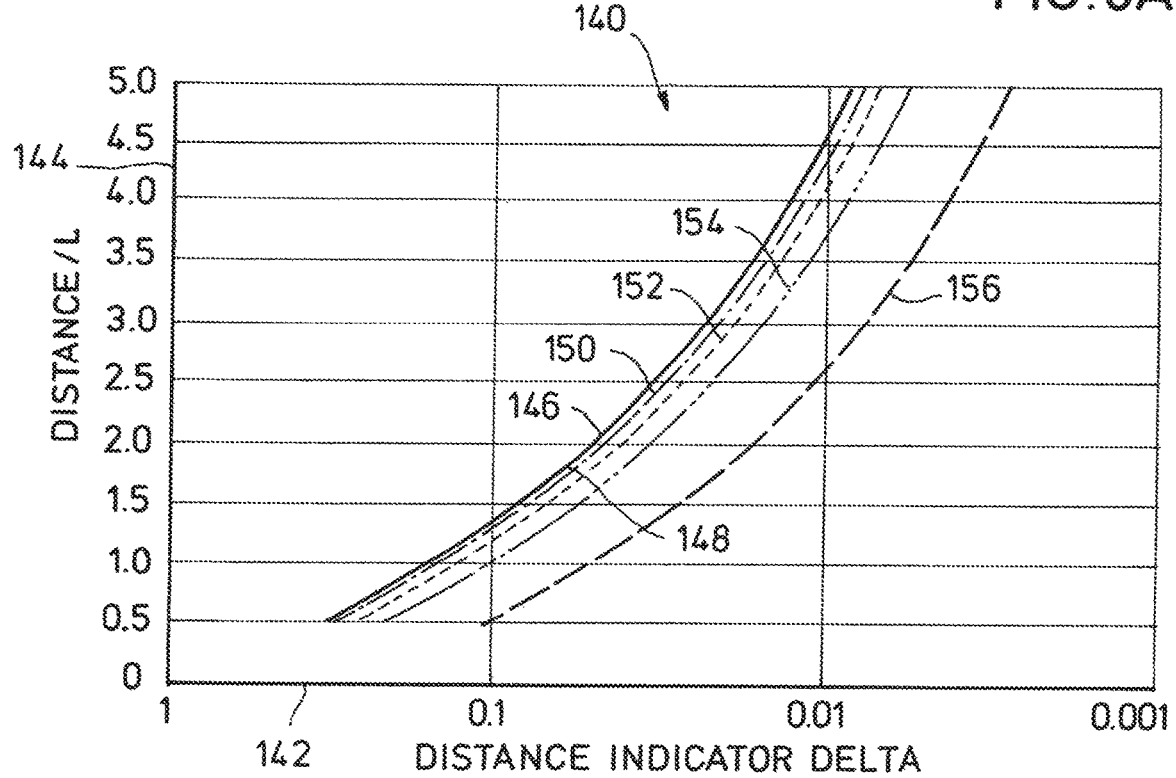

FIG. 6B includes a graph 140 representing data similar to that of FIG. 6A, but in a look around application; and where the prophetic data was simulated based on an imaging tool that is similar to tool 20B of FIG. 3B. Here, the abscissa 142 and ordinate 144 of FIG. 6B are the same as that of FIG. 6A. Line 146 of FIG. 6B represents a target formation made up primarily of salt, line 148 represents a resistivity ratio of 100, line 150 represents a resistivity ratio of 20, line 152 represents a resistivity ratio of 10, line 154 represents a resistivity ratio of 5, and line 156 represents a resistivity ratio of 2.

Figure 7A:
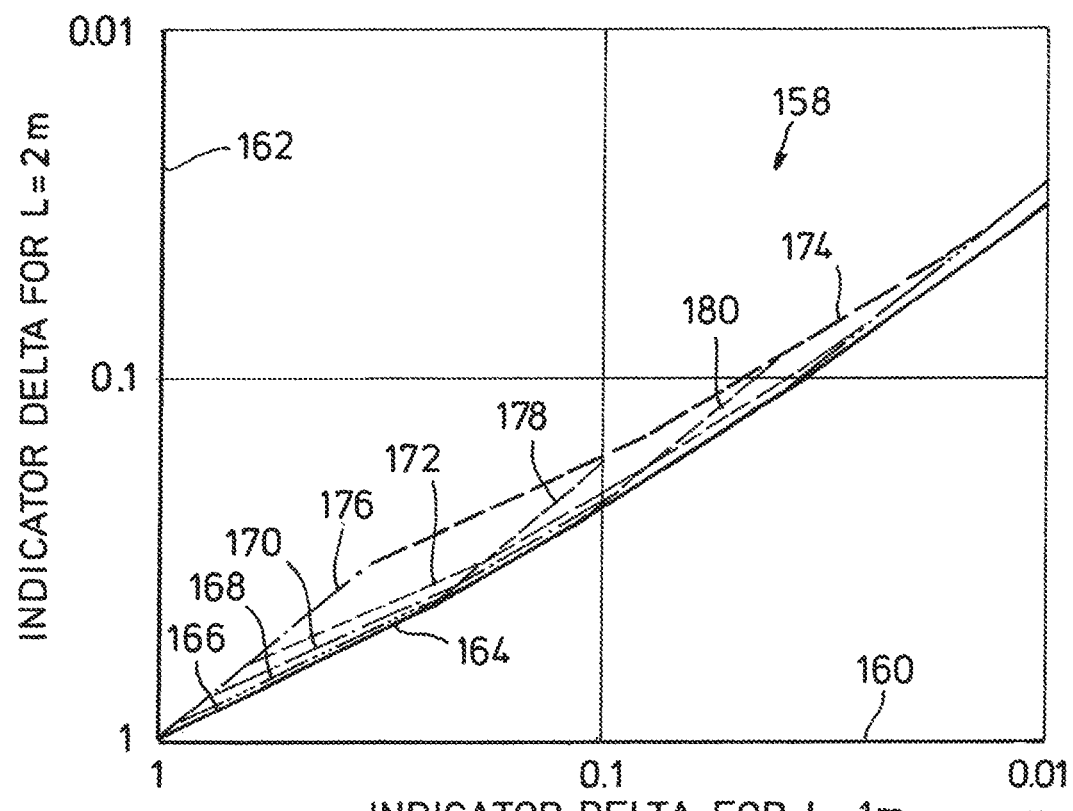
FIGS. 7A and 7B are graphs with plots formed with values of signal deviation of two different transducer offset values for different distance and for different conductivity ratios.

Provided in FIG. 7A shown is a graph 158 having an abscissa 160 and ordinate 162, where each of the abscissa 160 and ordinate 162 represent changes in percent magnitudes of an electric field sensed by a sensor. The data is based on simulated operation of an imaging tool having a transverse magnetic dipole source, with an orthogonal electric field sensor, or an orthogonal magnetic dipole source, with a transverse electric field sensor. The values of abscissa 160 are based on a spacing between the source and sensor of one meter, and the values of the ordinate 162 are indicator deltas based on a spacing between the source and sensor that is two meters. Graph 158 defines a nomograph representing look ahead data gathered by the imaging tool. Further in this example, line 164 represents data obtained where the target formation includes mainly salt. Line 166 represents data where a resistivity ratio is 100, line 168 illustrates data where a resistivity ratio are 20, line 170 represents data having a resistivity ratio of 10, line 172 represents data where the resistivity ratio is 5, and line 174 represents a resistivity ratio of 2. Additionally, line 176 illustrates a distance $D_1$ from the imaging tool 20 (FIG. 4) and bed boundary 84 of 0 meters, line 178 represents a distance $D_1$ of 0.5 meters, and line 180 represents data obtained where the distance $D_1$ is about 1 meter.

Figure 7B:
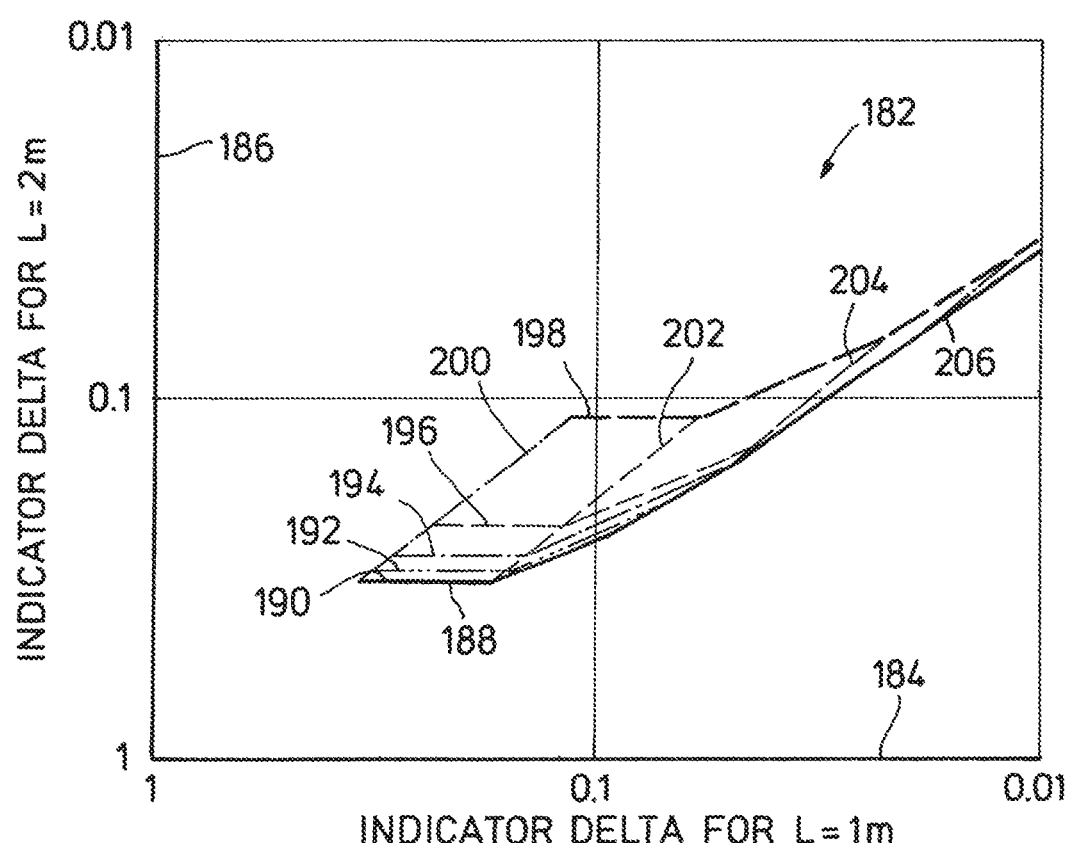

A similar nomograph to that of FIG. 7A is shown in the graph 182 of FIG. 7B where the abscissa 184 and ordinate 186 of graph 182 is the same as that of the abscissa 160 and ordinate 162 of FIG. 7A. In the example of FIG. 7B, the lines represent data obtained in a prophetic example of a look around application, and based on simulated operation of an imaging tool having an axial magnetic dipole source with transverse electric field measurement, or a tool having a transverse magnetic dipole source with axial electric field measurement. More specifically, line 188 represents data obtained where the target formation is made mainly of salt, line 190 is an example of where a resistivity ratio is 100, line 192 represents a resistivity ratio of 20, line 194 represents a resistivity ratio of 10, line 196 represents a resistivity ratio of 5, and line 198 represents a resistivity ratio of 2. Also, line 200 represents a look around distance D2 from the sensor to the bed boundary 84 of 0.5 meters, line 202 represents data of where the distance D2 is 1 meter, line 204 represents data where the distance D2 is 2 meters, and line 206 represents an offset distance D2 of 3 meters.

Referring now to FIG. 8A, shown in a side partial sectional view is an example of the tool 20A of FIG. 3A imaging a formation 14 that has substantially homogenous properties. Here, a magnetic field and magnetic dipole $M_X$ are generated by energizing coils 30A, 31A in transverse magnetic source 28A. Magnetic dipole $M_X$ is circumscribed by coils 30A, 31A, and extends along an X-axis (not shown) that is transverse to each of the Y and Z axes shown on the coordinate system. Electric field lines 208 are concentric generally circular lines, and are formed as a result of magnetic field and magnetic dipole $M_X$. Field lines 208 define an electrical field 210 that is in a plane substantially transverse to the direction of magnetic dipole $M_X$. As shown, electric field 210 is generally centric about magnetic dipole $M_X$. The presence of the electric field 210 sensed by electrodes 50A, 52A in sensor 48A is represented by electric field $E_Y$. As illustrated by the Cartesian coordinate provided in FIG. 8A, the direction of the electric field $E_Y$ is along the Y axis.

Illustrated in FIG. 8B is that the tool 20A has moved within wellbore 12 from its position of FIG. 8A to a location such that the electric field 210 interacts with the target formation 82 on the opposite side of bed boundary 84. The position of target formation 82 with respect to tool 20A results in a look ahead example of imaging. The interaction generates a series induced electric field lines 212, that in turn define an induced electric field 214. Electric field lines 212 are concentric and substantially circular. An induced electric field $E_{\bar{y}}$ is formed by induced electric field 214; that as shown is generally parallel with the electric field $E_Y$. The induced electric field lines 212 have a center that is spaced axially away from source 28A along the Z axis of the wellbore 12 and on a side of source 28A that is distal from sensor 48A. The electrodes 50A, 52A in sensor 48A sense both electric fields 210, 214, and which are represented by electric fields $E_Y$, $E_{Yi}$. A delta (indicator) value is obtained from the difference of the values of the electric fields 210, 214. In one example, the delta (indicator) value represents the ordinate values in FIGS. 5A-5C.

Depicted in FIG. 9A is a plan partial sectional view of an example of the tool 20C of FIG. 3C imaging a portion of formation 14 having substantially homogenous properties. Included with tool 20C is the transverse magnetic dipole source 28C and coils 30C, 31C, energizing coils 30C, 31C generates magnetic field and magnetic dipole $M_X$, which is circumscribed by coils 30C, 31C. Further shown is that magnetic dipole $M_X$ extends along an X-axis (not shown), which is transverse to each of the Y and Z axes on the illustrated coordinate system. The presence of the magnetic field and magnetic dipole $M_X$ induce a series of electric field lines 208 shown as concentric and generally circular lines. Electric field lines 216 define an electric field 218 shown within formation 14. Electric field $E_Z$ sensed by sensor is shown oriented along the Z axis of the illustrated coordinate system; in the example of FIG. 9A the magnitude of electric field $E_Z$ will be zero. Referring now to FIG. 9B, the target formation 82 is radially offset from the Y axis of the wellbore 12, which results in an induced electric field lines 220 that define an induced electric field 222 having an origin that is spaced radially away from the origin of electric field 218. The induced electric field 222 at the location of sensor 60C has non-zero Z axis component, thus an induced electric field $E_{Zi}$ is present that is measureable by the sensor 60C. Like in the example of FIG. 8B, the sensed magnitude of induced electric field $E_{Zi}$ provides information about the presence of and distance from bed boundary 84 and target formation 82. Also similar to FIGS. 8A, 8B, fields 218, 222 affect the presence, orientation, and magnitude of electric fields $E_Z$, $E_{Zi}$.

Referring now to FIG. 10A, shown in a side partial sectional view is an example of imaging tool 20B disposed in wellbore 12 and imaging formation 14. Axial magnetic dipole source 36B when energized generates a magnetic field having magnetic dipole $M_Z$ shown extending along the Z axis of the illustrated coordinate system. Magnetic field induces electric field lines 224, shown as circular concentric lines encircling the Z axis. Electric field lines 224 define electric field 226, that is sensed by electrodes 50B, 52B of sensor 48B. An electric field $E_Y$ represents the electric field 226 sensed by electrodes 50B, 52B, which has a value of zero from electric field 226. As shown in FIG. 10B, tool 20B is in a portion of wellbore 12 proximate target formation 82 and where lines 224 of electric field 226 interact with target formation 82 to produce induced electric lines 228 and an induced electric field 230. The induced electric lines 228 are circular and circumscribe an axis (not shown) disposed in target formation 82 and spaced radially away from the Z axis of FIG. 10B. An electric field $E_{Yi}$ represents the induced electric field 230 sensed by electrodes 50B, 52B, and which has a non-zero value.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of operations in a borehole comprising:
   generating a magnetic dipole in the borehole that induces an electric field;
   sensing information about the electric field in a first direction and in a second direction that is transverse to the first direction and orthogonal to the magnetic dipole; and
   identifying a target formation spaced axially from the magnetic dipole based on information sensed from the electric field.

2. The method of claim 1, wherein the target formation is spaced radially away from the magnetic dipole.

3. The method of claim 1, wherein information about the electric field is sensed with a first sensor in the first direction, and a second sensor in the second direction that is collocated with the first sensor.

4. The method of claim 3, wherein the step of sensing information about the electric field in a first direction comprises obtaining a first magnitude of the electric field at a first location in the borehole, obtaining a second magnitude of the electric field at a second location in the borehole, and comparing the first and second magnitudes, and wherein a location of the target formation is obtained based on comparing the first and second magnitudes.

5. The method of claim 3, wherein the step of sensing information about the electric field in a second direction comprises obtaining a first magnitude of the electric field at a first location in the borehole, obtaining a second magnitude of the electric field at a second location in the borehole, and comparing the first and second magnitudes, and wherein a location of the target formation is obtained based on comparing the first and second magnitudes.

6. The method of claim 3, wherein the information about the electric field in a first direction comprises a difference in electrical potential between two axially spaced apart locations in the borehole, and wherein an electrode ring is disposed at each of the two axially spaced apart locations, and wherein the information about the electric field in a second direction comprises a difference in electrical potential between two radially spaced apart locations in the wellbore, and wherein an electrode is disposed at each of the two radially spaced apart locations.

7. The method of claim 1, wherein the magnetic dipole is oriented transverse to an axis of the borehole.

8. A method of operations in a borehole comprising:
   generating a magnetic dipole in the borehole that produces an electric field;
   measuring a characteristic of the electric field in a first direction that is orthogonal to the magnetic dipole, and in a second direction that is transverse to the magnetic dipole; and
   identifying a target formation based on the step of measuring a characteristic of the electric field.

9. The method of claim 8, wherein the step of measuring a characteristic of the electric field in a first direction defines look ahead data, and the step of measuring a characteristic of the electric field in a second direction defines look around data.

10. The method of claim 9, wherein measuring in the orthogonal direction comprises using sensors that are spaced radially from an axis of the wellbore, and wherein measuring in the transverse direction comprises ring sensors spaced parallel with the axis.

11. The method of claim 8, wherein the characteristic of the electric field comprises electric potential, and which is measured at two spaced apart locations that are intersected by a path extending transverse to the magnetic dipole, and wherein the magnetic dipole is oriented transverse to an axis of the wellbore, and the path is oriented transverse to the axis.

12. The method of claim 8, wherein the characteristic of the electric field comprises electric potential, and which is measured at two spaced apart locations that are intersected by a path extending transverse to the magnetic dipole, and wherein the magnetic dipole is oriented transverse to an axis of the wellbore, and the path is oriented parallel with the axis.

13. A tool for use in a borehole comprising:
a housing having an axis;
a means for forming a magnetic dipole that is oriented transverse to the axis;
a means for sensing a characteristic of an electric field generated by the magnetic dipole; and
a means for identifying the presence of a target formation based on the sensed characteristic of the electric field, and that is sensed in a first direction that is orthogonal to the magnetic dipole, and in a second direction that is transverse to the first direction.

14. The tool of claim 13, further comprising a means for sensing a characteristic of an electric field generated by the magnetic dipole in a direction transverse to the magnetic dipole, and wherein the means for forming the magnetic dipole forms an electric field, and wherein the means for sensing a characteristic of the electric field measures in a direction orthogonal to the magnetic dipole, wherein the means for identifying the presence of a target formation identifies target formations that are forward of the borehole and that circumscribe the borehole, and wherein the means for sensing a characteristic of the electric field comprises electrode rings that are axially spaced apart from one another and coupled with the housing.

15. The tool of claim 14, wherein the means for sensing a characteristic of the electric field in a direction transverse to the magnetic dipole measures a change of electrical potential of the electric field over a distance in a direction that is transverse to the magnetic dipole, and wherein the means for sensing a characteristic of the electric field in a direction transverse to the magnetic dipole measures a change of electrical potential of the electric field over a distance in a direction that is parallel with the axis.

16. The tool of claim 13, wherein the means for sensing a characteristic of the electric field in a direction that is orthogonal to the magnetic dipole comprises electrodes that are spaced radially away from one another.

\* \* \* \* \*